United States Patent
Wu

(10) Patent No.: US 7,011,537 B1
(45) Date of Patent: Mar. 14, 2006

(54) SIM CARD CONNECTOR WITH CARD EJECTION MECHANISM

(75) Inventor: Yin-Lung Wu, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/145,700

(22) Filed: Jun. 6, 2005

(51) Int. Cl.
*H01R 13/62* (2006.01)

(52) U.S. Cl. .................................. 439/159; 439/326

(58) Field of Classification Search .............. 439/159, 439/160, 326, 630
See application file for complete search history.

(56) References Cited

U.S. PATENT DOCUMENTS

| | | | | |
|---|---|---|---|---|
| 6,027,350 A | * | 2/2000 | Chen et al. | 439/159 |
| 6,106,317 A | * | 8/2000 | Michaelis et al. | 439/326 |
| 6,174,188 B1 | * | 1/2001 | Martucci | 439/326 |
| 6,247,947 B1 | * | 6/2001 | Knoernschild et al. | 439/159 |
| 6,743,035 B1 | * | 6/2004 | Yang | 439/326 |
| 6,913,479 B1 | * | 7/2005 | Su et al. | 439/326 |

* cited by examiner

*Primary Examiner*—Hien Vu
*Assistant Examiner*—X. Chung-Trans

(57) ABSTRACT

A SIM card connector includes a housing base and a card ejection mechanism. The housing base has a pair of sidewalls, a front notch and a rear notch recessed in the sidewall. The card ejection mechanism includes a cover slidably mounted on the housing base to form a receiving cavity for receiving a SIM card. The cover has a pair of side panels to enclose the sidewalls. According to an aspect of the invention, the side panel defines a sliding slot. The sidewall forms a locating block received in the sliding slot to guide the sliding of the cover and prevent the cover from further sliding when the locating block engages with the ends of the sliding slot. According to another aspect of the invention, the front and rear ends of the housing base respectively form a stopping bar and a stopping block to prevent the cover from further sliding. The side panel further provides a hook which engages with the front notch when the SIM card is fully inserted in the receiving cavity to prevent the cover from moving backward or engages with the rear notch when the SIM card is pushed out from the receiving cavity to prevent the cover from moving forward.

7 Claims, 5 Drawing Sheets

SIM CARD CONNECTOR WITH CARD EJECTION MECHANISM

BACKGROUND OF THE INVENTION

1. Field of the Invention

The present invention relates to a SIM card connector with card ejection mechanism, and more particularly, to a SIM card connector capable of locating the card ejection mechanism at predetermined positions and accommodating a SIM card reliably.

2. The Related Art

SIM (Subscriber Identification Module) card connectors are widely applied in mobile phones to accommodate a SIM card that has the memory space to store the related information as backup data, such as the personal phone book, the phone number of the mobile phone, and the communication parameters, which can be used by the user when the communication is taken.

Conventional SIM card connector with card ejection mechanism includes a housing base with an opening and a card ejection mechanism for pushing the SIM card out from the connector. The card ejection mechanism includes a main body slidably mounted in the opening of the housing base. A member of receiving force formed at one end of the main body protrudes out from the opening of the housing base. A pushing member formed at an opposite end of the main body is inside of the connector so as to contact with the SIM card. When the member of receiving force is exerted by a force, the member of receiving force drives the main body and the pushing member so as to push the SIM card out of the SIM card connector by the pushing member.

When the SIM card is inserted into the SIM card connector and being in use, however, there is no positioning or locking mechanism between the card ejection mechanism and the housing base of the conventional SIM card connector, so the card ejection mechanism is very likely to move once it is vibrated. The movement of the card ejection mechanism will make the SIM card disengage with the SIM card connector, which will cause the communication of the mobile phone to be interrupted.

SUMMARY OF THE INVENTION

An aspect of the present invention is a SIM card connector with card ejection mechanism including:
  a housing base having a pair of sidewalls extending upwardly from opposite sides thereof, at least one sidewall having a locating block projecting sideward, and at least one sidewall defining a recess, two opposite ends of the recess being further recessed to form a front notch and a rear notch, middle portion of the recess being protruded to form a protruding block;
  a plurality of terminals mounted in the housing base; and
  a card ejection mechanism comprising a cover slidably mounted on the housing base to form a receiving cavity for receiving a SIM card, the terminals extending into the receiving cavity for electrically connecting the SIM card, the cover having a pushing tab at a front end thereof and an operating tab at a rear end thereof, the operating tab extending upwardly for being accessible, the pushing tab extending downwardly into the receiving cavity so as to push the SIM card out from the receiving cavity when the operating tab is pulled, the cover further having a pair of side panels extending downwardly from opposite sides thereof to enclose the pair of sidewalls, at least one side panel defining a sliding slot, the locating block being received in the sliding slot to guide the sliding of the cover and prevent the cover from further sliding when the locating block engages with the ends of the sliding slot, and at least one side panel providing a hook which engages with the front notch when the SIM card is fully inserted in the receiving cavity or engages with the rear notch when the SIM card is pushed out from the receiving cavity.

As the above mentioned, when a SIM card is inserted into the SIM card connector and being in use, the cover cannot move forward relative to the housing base for the locating block engaging with the rear end of the sliding slot, and the cover cannot move backward relative to the housing base for the hook engaging with the front notch. Accordingly, the cover is secured to the housing base, and the SIM card can be reliably retained in the SIM card connector. Furthermore, when the SIM card is pushed out from the SIM card connector, the cover is also positioned because the locating block engages with the front end of the sliding slot to prevent the cover from moving backward, and the hook engages with the rear notch to prevent the cover from moving forward.

Another aspect of the present invention is a SIM card connector with card ejection mechanism including:
  a housing base which forms a stopping bar at a front end thereof and a stopping block at a rear end thereof, the housing base having a pair of sidewalls extending upwardly from opposite sides thereof, at least one sidewall having a guiding component, and at least one sidewall defining a recess, two opposite ends of the recess being further recessed to form a front notch and a rear notch, middle portion of the recess being protruded to form a protruding block;
  a plurality of terminals mounted in the housing base; and
  a card ejection mechanism comprising a cover slidably mounted on the housing base to form a receiving cavity for receiving a SIM card, the terminals extending into the receiving cavity for electrically connecting the SIM card, the cover having a pushing tab at a front end thereof and an operating tab at a rear end thereof, the operating tab extending upwardly for being accessible, the pushing tab extending downwardly into the receiving cavity so as to push the SIM card out from the receiving cavity when the operating tab is pulled, the cover further having a pair of side panels extending downwardly from opposite sides thereof to enclose the pair of sidewalls, at least one side panel having a guiding member engaging with the guiding component of the sidewall to guide the sliding of the cover, and at least one side panel providing a hook which engages with the front notch when the SIM card is fully inserted in the receiving cavity or engages with the rear notch when the SIM card is pushed out from the receiving cavity,
  wherein when the SIM card is fully inserted in the receiving cavity, the stopping bar retains the cover, and when the SIM card is pushed out from the receiving cavity, the stopping block retains the cover.

As the above mentioned, when a SIM card is inserted into the SIM card connector and being in use, the cover cannot move forward relative to the housing base because of being retained by the stopping bar, and the cover cannot move backward relative to the housing base for the hook engaging with the front notch. Accordingly, the cover is secured to the housing base, and the SIM card can be reliably retained in the SIM card connector. Furthermore, when the SIM card is pushed out from the SIM card connector, the cover is also positioned because the stopping block retains the cover to prevent the cover from moving backward, and the hook engages with the rear notch to prevent the cover from moving forward.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
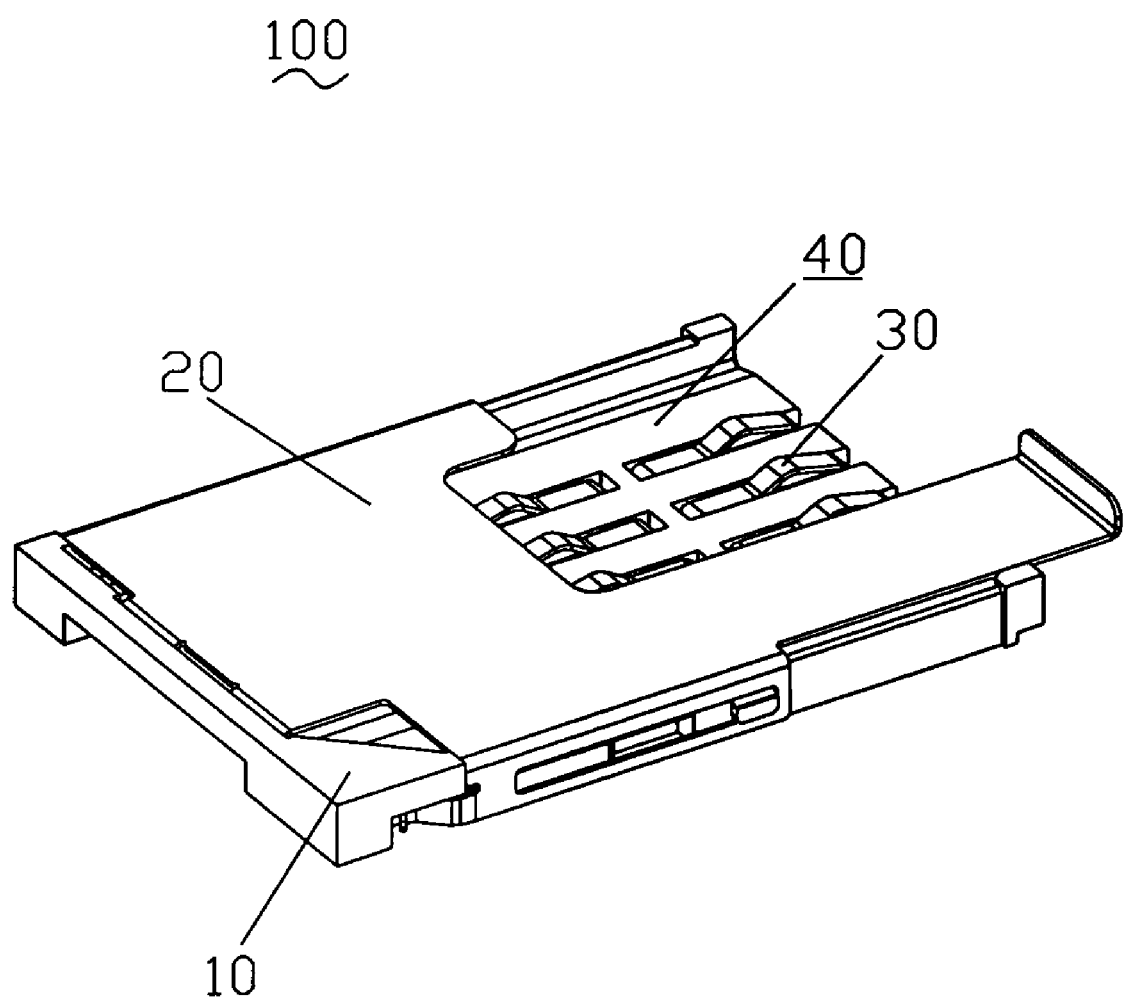
FIG. 1 is a perspective view of a SIM card connector with card ejection mechanism according to the present invention.
Figure 6:
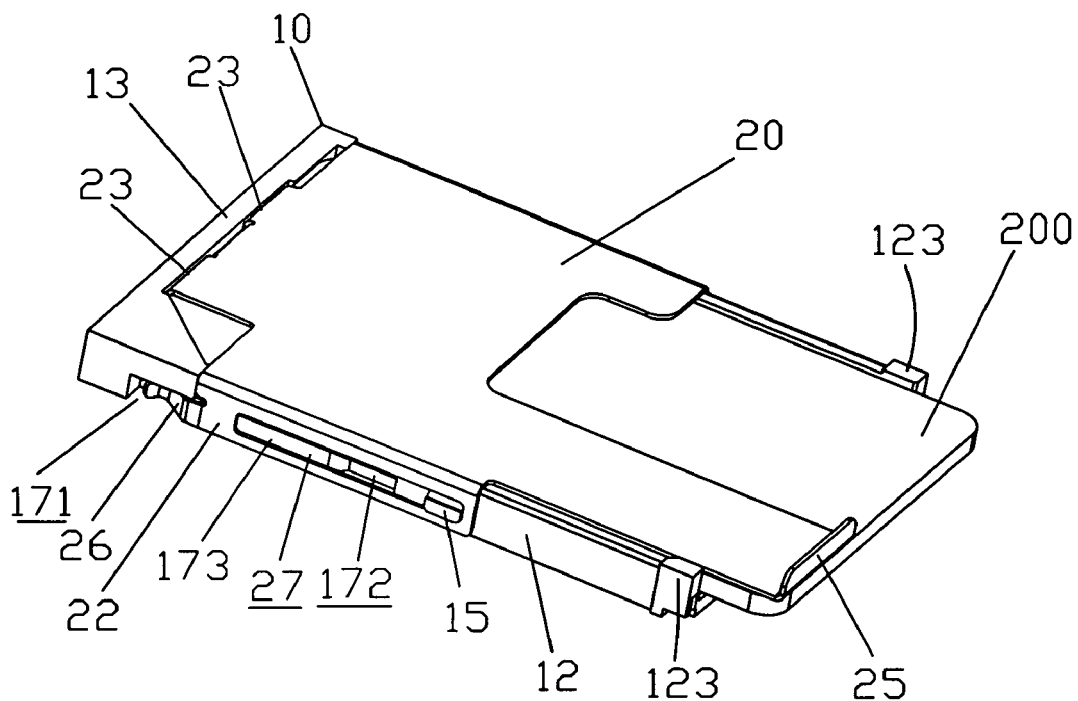
FIG. 6 is a perspective view of the SIM card connector with card ejection mechanism, illustrating the SIM card being inserted into the SIM card connector.
Figure 7:
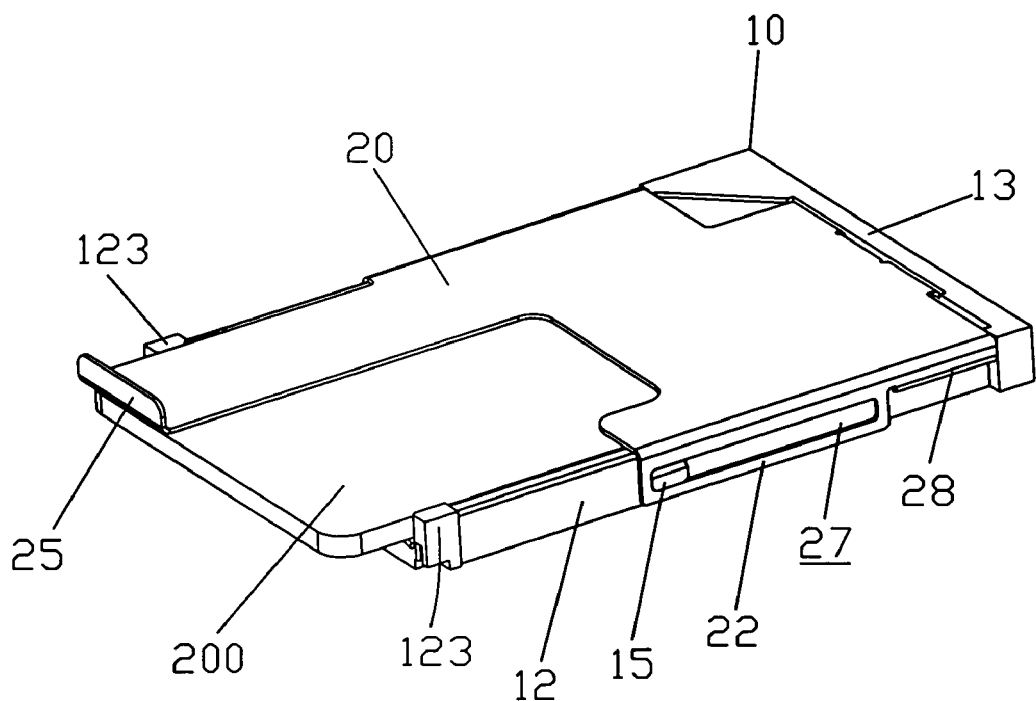
FIG. 7 is another perspective view of the SIM card connector with card ejection mechanism, illustrating the SIM card being inserted into the SIM card connector.

FIG. 1 shows a SIM card connector 100 with card ejection mechanism according to the present invention. The SIM card connector 100 has a housing base 10, a plurality of terminals 30 mounted in the housing base 10, and a cover 20 slidably mounted on the housing base 10 to define a receiving cavity 40 therebetween for receiving a SIM (Subscriber Identification Module) card 200 as can be seen in FIGS. 6 and 7. The cover 20 is also designed to function as a card ejection mechanism as will be described in greater detail hereinafter.

Figure 2:
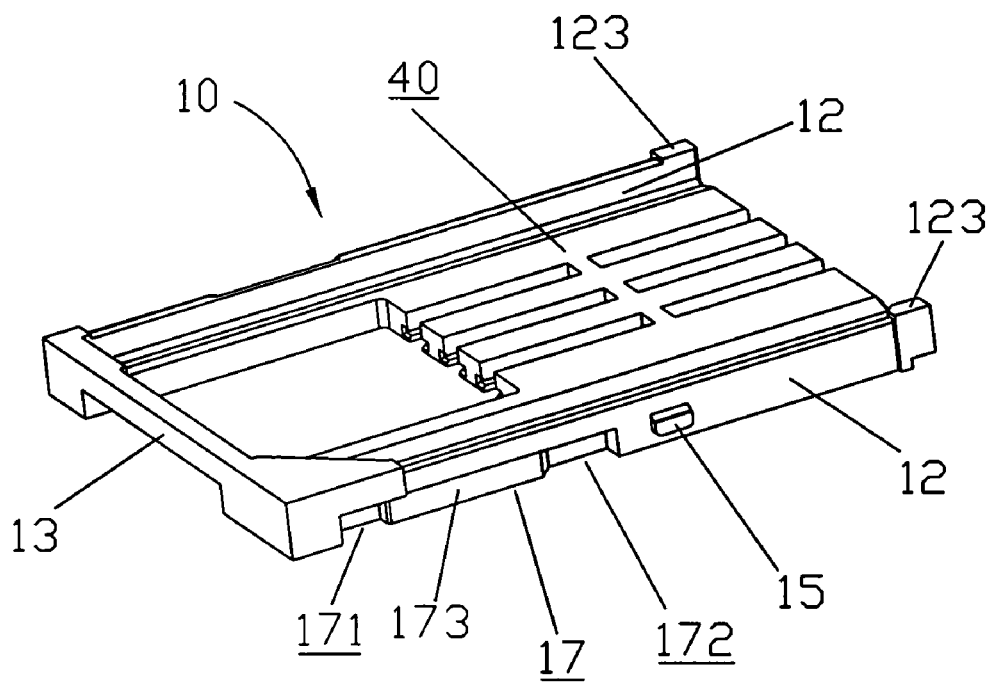
FIG. 2 is a perspective view of a housing base for the SIM card connector with card ejection mechanism as shown in FIG. 1.
Figure 3:
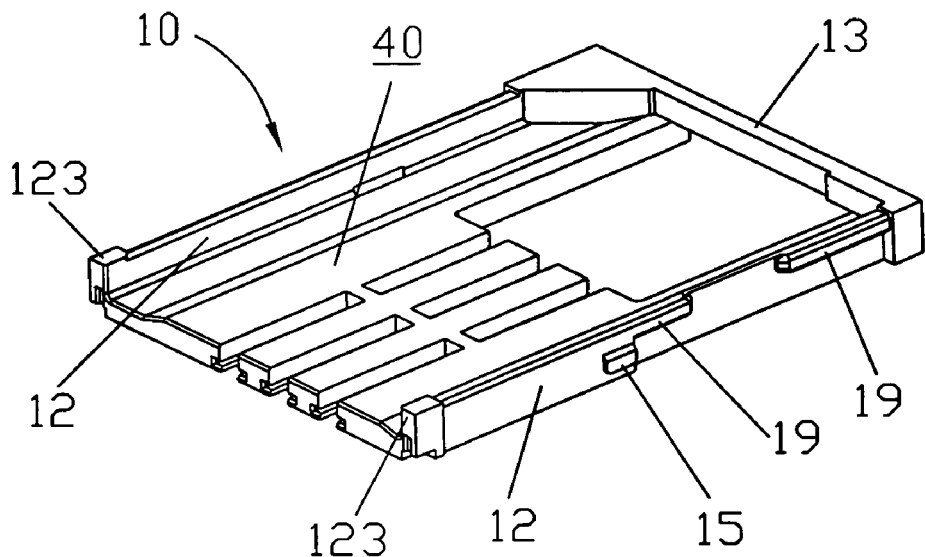
FIG. 3 is another perspective view of the housing base seen from another point of view.

Referring to FIGS. 2 and 3, the housing base 10 has a pair of sidewalls 12 extending upwardly from two opposite sides thereof. The sidewalls 12 each have a locating block 15 projecting sideward from about middle portions thereof. One of the sidewalls 12 defines a recess 17 in the front end thereof. Two opposite ends of the recess 17 are further recessed so as to form a front notch 171, a rear notch 172, and a protruding block 173 located between the front notch 171 and the rear notch 172. The other sidewall 12 is also recessed in the front end thereof and provides a protruding bar 19 protruding sideward from an upper edge of the recessed portion. The housing base 10 further forms a stopping bar 13 at a front end thereof and two stopping block 123 at a rear end thereof. The stopping bar 13, as if a bridge, connects the front ends of the two sidewalls 12. The stopping blocks 123 extend upwardly from the rear ends of the two sidewalls 12.

Figure 4:
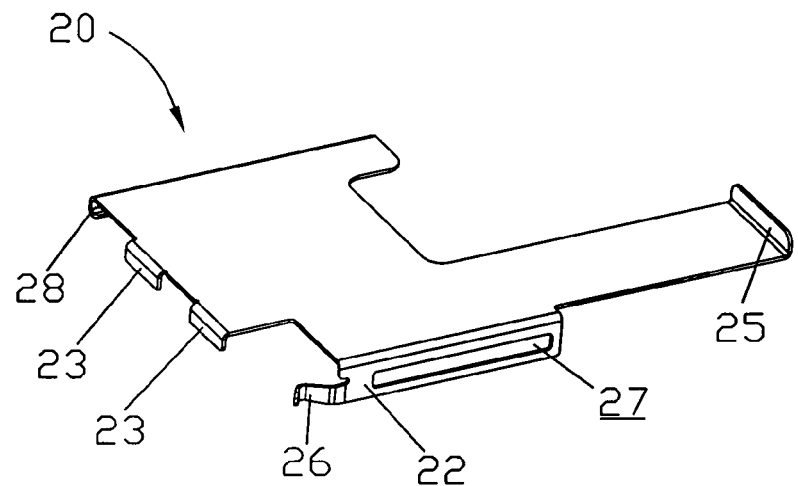
FIG. 4 is a perspective view of the cover for the SIM card connector with card ejection mechanism as shown in FIG. 1.
Figure 5:
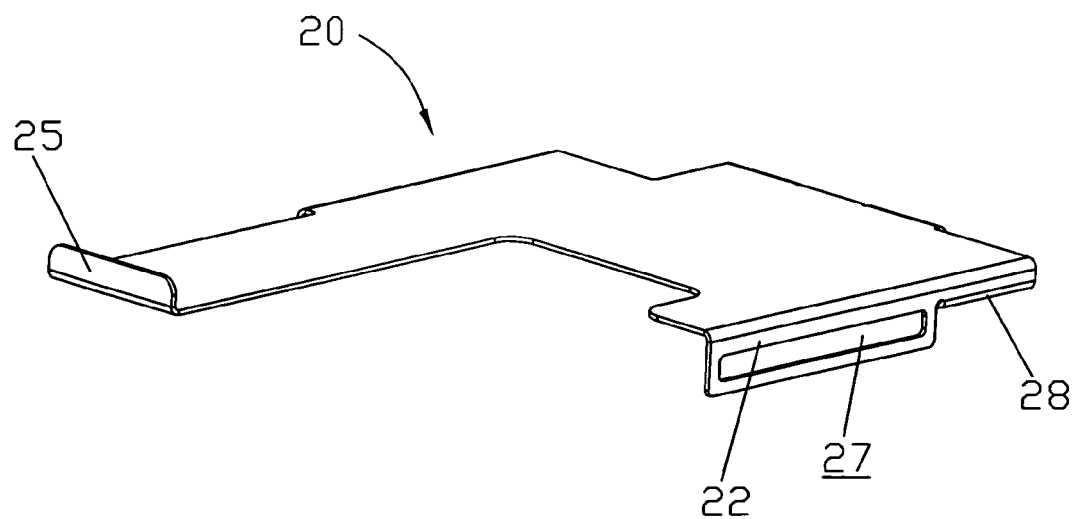
FIG. 5 is another perspective view of the cover seen from another point of view.

Referring to FIGS. 4 and 5 in conjunction with FIGS. 6–9, the cover 20 has a pair of side panels 22 extending downwardly from opposite sides thereof for enclosing the pair of sidewalls 12 of the housing base 10. The side panels 22 each define a sliding slot 27 which are used for receiving the locating block 15 so as to guide the sliding of the cover 20 and to prevent the cover 20 from further sliding when the locating block 15 engages with the ends of the sliding slot 27. One of the panels 22 further provides a hook 26 formed on the front end thereof and extending forwardly and inwardly. The other panels 22 has a front portion bent inward to form a L-shaped guiding track 28 which is used for engaging with the protruding bar 19 of the housing base 10 so as to guide the sliding of the cover 20 as well. An operating tab 25 is formed at the rear end of the cover 20, extending upwardly and vertically for being accessible. Two pushing tabs 23 are bent downwardly and vertically from the front end of the cover 20 so as to extend into the receiving cavity 40 to contact with the front end of the SIM card 200. Once the cover 20 is slid backward by pulling the operating tab 25, the pushing tabs 23 push the SIM card 200 out from the receiving cavity 40, so the cover 20 is also functioned as a card ejection mechanism.

Referring to FIG. 6 and FIG. 7, in assembling of the SIM card connector 100 of present invention, firstly the terminals 30 are mounted in the housing base 10 and extend into the receiving cavity 40 for electrically connecting the SIM card 200. Thereafter, the cover 20 is covered on the housing base 10 with the pair of the side panels 22 enclosing the pair of sidewalls 12. After the locating blocks 15 are inserted into the corresponding sliding slots 27 and the L-shaped guiding track 28 is engaged with the protruding bar 19, the cover 20 can be slid relative to the housing base 10. Then the SIM card 200 can be inserted in the receiving cavity 40 and electrically connects the SIM card connector 100.

The insertion of the SIM card 200 into the SIM card connector 100 pushes the cover 20 to slide forward under the guiding of the sliding slot 27, the locating block 15, the guiding track 28 and the protruding bar 19, until the stopping bar 13 stops and retains the front end of the SIM card 200 and the locating block 15 engages with the rear end of the sliding slot 27. At this position, the SIM card 200 is fully inserted in the SIM card connector 100, and the hook 26 engages with the front notch 171 to prevent the cover 20 from moving backward. Therefore, the cover 20 is located at the SIM card fully inserted position; thereby ensuring the SIM card connector 100 accommodates the SIM card 200 reliably.

Figure 8:
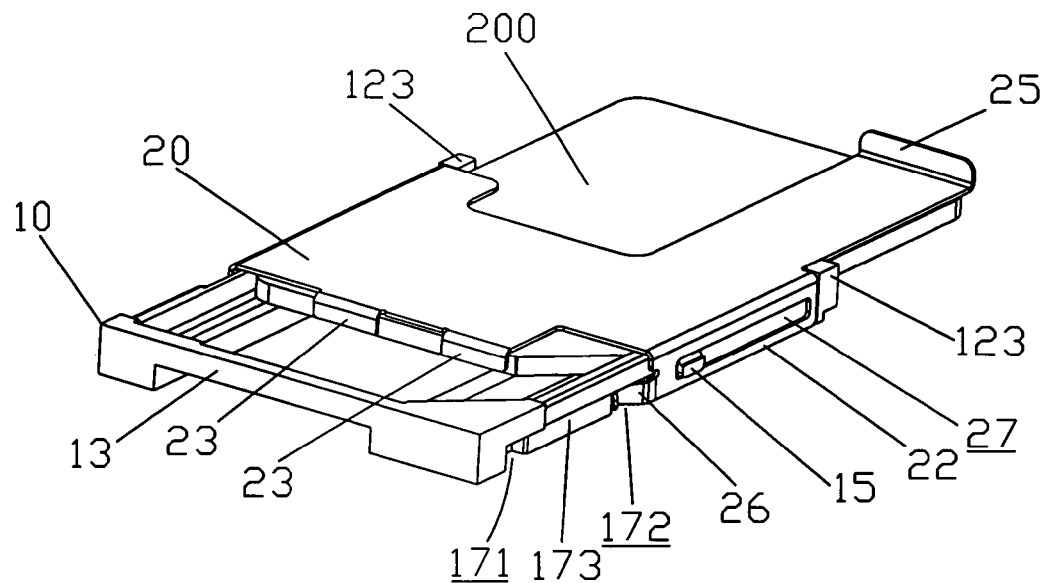
FIG. 8 is a perspective view of the SIM card connector with card ejection mechanism, illustrating a SIM card being pushed out from the SIM card connector.
Figure 9:
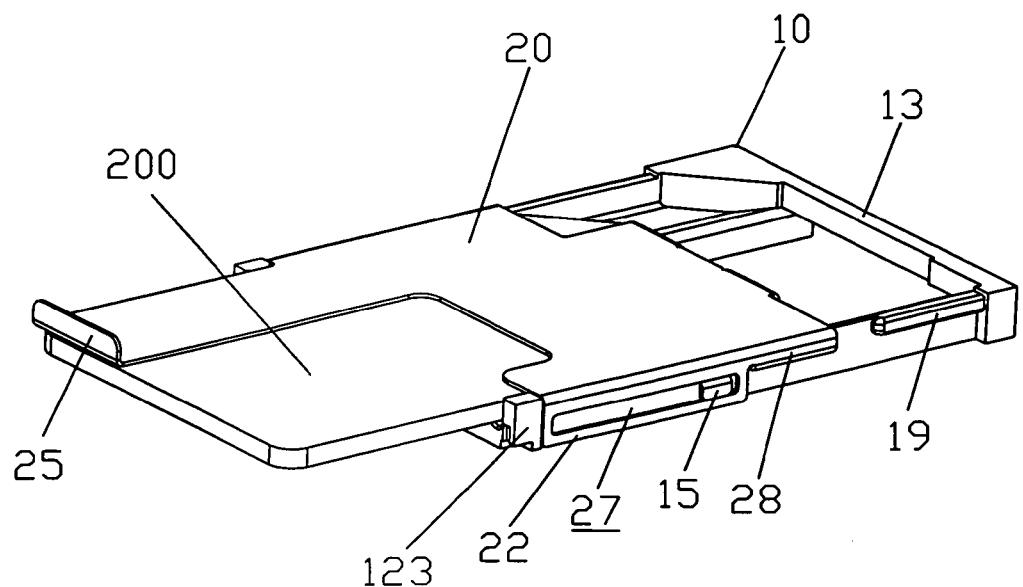
FIG. 9 is another perspective view of the SIM card connector with card ejection mechanism seen from another point of view, illustrating the SIM card being pushed out from the SIM card connector.

In handling of removing the SIM card 200, as shown in FIGS. 8 and 9, an operator simply grasps the operating tab 25 to pull the cover 20 to slide backward, simultaneously the pushing tab 23 of the cover pushes the SIM card 200 to move backward until the stopping blocks 123 stop and retain the rear end of the side panels 22 of the cover 20 and the locating block engages with the front end the sliding slot 27. At this position, the SIM card 200 is pushed out from the SIM card connector 100, and the hook 26 engages with the rear notch 172 to prevent the cover 20 from moving forward. Therefore, the cover 20 is also located.

It can be seen from the mentioned above that, the sliding slots 27 of the cover 20 receive the locating blocks 15 so as to guide the sliding of the cover 20 and prevent the cover 20 from further sliding when the locating blocks 15 engage with the ends of the sliding slots 27, and that the hook 26 engages with the front notch 171 when the SIM card 200 is fully inserted in the receiving cavity 40 or engages with the rear notch 172 when the SIM card 200 is pushed out from the receiving cavity 40.

It can also be seen from the mentioned above that, the locating blocks 15 and the protruding bar 19 both act as guiding components for guiding the cover 20 sliding on the housing base 10 front to rear. Correspondingly, the sliding slot 27 and the guiding track 28 also act as guiding members matching with the locating blocks 15 and the protruding bar 19. The stopping bar 13 is used for retaining the cover 20 when the SIM card 200 is fully inserted in the receiving cavity 40, and the stopping blocks 123 is used for retaining the cover 20 when the SIM card 200 is pushed out from the receiving cavity 40.

While the present invention has been described with reference to some specific embodiment thereof, the description is illustrative and is not to be construed as limiting the invention. Various modifications to the present invention may be made to the preferred embodiment by those skilled in the art without departing from the true spirit and scope of the invention as defined by the appended claims.

What is claimed is:

1. A SIM card connector with card ejection mechanism comprising:
    a housing base having a pair of sidewalls extending upwardly from opposite sides thereof, at least one sidewall having a locating block projecting sideward, and at least one sidewall defining a recess, two opposite ends of the recess being further recessed to form a front notch and a rear notch, middle portion of the recess being protruded to form a protruding block;
    a plurality of terminals mounted in the housing base; and
    a card ejection mechanism comprising a cover slidably mounted on the housing base to form a receiving cavity for receiving a SIM card, said terminals extending into the receiving cavity for electrically connecting the SIM card, the cover having a pushing tab at a front end thereof and an operating tab at a rear end thereof, the operating tab extending upwardly for being accessible, the pushing tab extending downwardly into the receiving cavity so as to push the SIM card out from the receiving cavity when the operating tab is pulled, the cover further having a pair of side panels extending downwardly from opposite sides thereof to enclose the pair of sidewalls, at least one side panel defining a sliding slot, the locating block being received in the sliding slot to guide the sliding of the cover and prevent the cover from further sliding when the locating block engages with the ends of the sliding slot, and at least one side panel providing a hook which engages with the front notch when the SIM card is fully inserted in the receiving cavity or engages with the rear notch when the SIM card is pushed out from the receiving cavity.

2. The SIM card connector with card ejection mechanism as claimed in claim 1, wherein a stopping bar is formed at a front end of the housing base to retain the cover when the SIM card is fully inserted in the receiving cavity.

3. The SIM card connector with card ejection mechanism as claimed in claim 1, wherein one of the sidewalls provides a protruding bar protruding sideward, and a portion of the side panels is bent inward to form a L-shaped guiding track for engaging with the protruding bar to guide the sliding of the cover.

4. The SIM card connector with card ejection mechanism as claimed in claim 1, wherein a stopping block is formed at a rear end of the housing base to retain the cover when the SIM card is pushed out from the receiving cavity.

5. A SIM card connector with card ejection mechanism comprising:
    a housing base which forms a stopping bar at a front end thereof and a stopping block at a rear end thereof, the housing base having a pair of sidewalls extending upwardly from opposite sides thereof, at least one sidewall having a guiding component, and at least one sidewall defining a recess, two opposite ends of the recess being further recessed to form a front notch and a rear notch, middle portion of the recess being protruded to form a protruding block;
    a plurality of terminals mounted in the housing base; and
    a card ejection mechanism comprising a cover slidably mounted on the housing base to form a receiving cavity for receiving a SIM card, said terminals extending into the receiving cavity for electrically connecting the SIM card, the cover having a pushing tab at a front end thereof and an operating tab at a rear end thereof, the operating tab extending upwardly for being accessible, the pushing tab extending downwardly into the receiving cavity so as to push the SIM card out from the receiving cavity when the operating tab is pulled, the cover further having a pair of side panels extending downwardly from opposite sides thereof to enclose the pair of sidewalls, at least one side panel having a guiding member engaging with the guiding component of the sidewall to guide the sliding of the cover, and at least one side panel providing a hook which engages with the front notch when the SIM card is fully inserted in the receiving cavity or engages with the rear notch when the SIM card is pushed out from the receiving cavity,
    wherein when the SIM card is fully inserted in the receiving cavity, the stopping bar retains the cover, and when the SIM card is pushed out from the receiving cavity, the stopping block retains the cover.

6. The SIM card connector with card ejection mechanism as claimed in claim 5, wherein the guiding component of the sidewall is a locating block projecting sideward, the guiding member of the side panel is a sliding slot for receiving the locating block.

7. The SIM card connector with card ejection mechanism as claimed in claim 5, wherein the guiding component of the sidewall is a protruding bar protruding sideward, the guiding member of the side panel is a L-shaped guiding track for engaging with the protruding bar.

* * * * *